United States Patent
Geiselhart et al.

(10) Patent No.: US 11,354,337 B1
(45) Date of Patent: Jun. 7, 2022

(54) ONLINE REORGANIZATION OF DATABASE TABLES WITH CONCURRENT UPDATES USING VIRTUAL PARTITIONS

(71) Applicant: International Business Machines Corporation, Armonk, NY (US)

(72) Inventors: Reinhold Geiselhart, Rottenburg-Ergenzingen (DE); Felix Beier, Haigerloch (DE); Knut Stolze, Hummelshain (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 17/146,835

(22) Filed: Jan. 12, 2021

(51) Int. Cl.
| | |
|---|---|
| *G06F 16/00* | (2019.01) |
| *G06F 16/27* | (2019.01) |
| *G06F 16/2455* | (2019.01) |
| *G06F 16/25* | (2019.01) |
| *G06F 16/188* | (2019.01) |
| *G06F 16/21* | (2019.01) |
| G06F 9/50 | (2006.01) |

(52) U.S. Cl.
CPC .......... *G06F 16/278* (2019.01); *G06F 16/192* (2019.01); *G06F 16/217* (2019.01); *G06F 16/24554* (2019.01); *G06F 16/254* (2019.01); G06F 9/5061 (2013.01); G06F 9/5077 (2013.01); G06F 9/5083 (2013.01); G06F 2212/152 (2013.01)

(58) Field of Classification Search
CPC ............. G06F 16/192; G06F 16/217; G06F 16/24554; G06F 16/254; G06F 16/278; G06F 9/5061; G06F 9/5077; G06F 9/5083; G06F 2212/152
See application file for complete search history.

(56) References Cited

U.S. PATENT DOCUMENTS

| 10,289,723 | B1 * | 5/2019 | Cai | ..................... G06F 16/2453 |
| 2015/0347484 | A1 * | 12/2015 | Klauke | ................. G06F 16/221 707/741 |
| 2016/0292226 | A1 | 10/2016 | Konik | |
| 2018/0039534 | A1 | 2/2018 | Cai | |
| 2018/0089262 | A1 | 3/2018 | Bhattacharjee | |

(Continued)

OTHER PUBLICATIONS

Geiselhart et al., "Online Reorganization of Database Tables With Concurrent Updates", U.S. Appl. No. 17/015,649, filed Sep. 9, 2020, pp. 1-32.

*Primary Examiner* — Diedra McQuitery
(74) *Attorney, Agent, or Firm* — Stephanie L. Carusillo (57) ABSTRACT

In an approach to online reorganization of database tables with concurrent updates using virtual partitions, responsive to receiving a table to reorganize, rows of the first table are selected, where the rows of the first table create a first virtual partition. A memory for a second virtual partition is allocated, where the second virtual partition is appended to a second table. A union view is created comprising a union of remaining rows of the first table with the second table, where the remaining rows of the first table have not been copied to the second table. The first virtual partition is copied into the second virtual partition. Responsive to receiving queries before copying the first virtual partition into the second virtual partition is complete, the queries are allowed to access the union view.

20 Claims, 6 Drawing Sheets

(56) References Cited

U.S. PATENT DOCUMENTS

| | | |
|---|---|---|
| 2018/0189370 A1* | 7/2018 | Bendel ................... G06F 16/27 |
| 2019/0129985 A1* | 5/2019 | Schlarb ............... G06F 16/2452 |
| 2019/0129986 A1* | 5/2019 | Birn ................... G06F 16/2343 |
| 2020/0125584 A1 | 4/2020 | Barry |

* cited by examiner

ONLINE REORGANIZATION OF DATABASE TABLES WITH CONCURRENT UPDATES USING VIRTUAL PARTITIONS

BACKGROUND

The present invention relates generally to the field of database partitioning, and more particularly to online reorganization of database tables with concurrent updates using virtual partitions.

Database partitioning helps a database administrator to adapt to data growth by providing a way to expand the capacity of the system and scale for performance. A distribution key is a column (or group of columns) that is used to determine the database partition in which a particular row of data is stored. Choosing a good distribution key is important to spread the data evenly across all database partitions in the database partition group.

Columns having the highest cardinality or unique keys are good candidates for distribution keys. Columns with uneven data distribution, with a small number of distinct values, or those which are updated frequently might result in skew, where query processing involves more work on a subset of database partitions and less work on others. Furthermore, partitions can be added or removed within the database environment resulting in an unbalanced system.

There are other complex situations, however, where a major reorganization of the database is required to ensure that the database remains relevant and useful. In these scenarios, data can be redistributed or reorganized by moving it within a partitioned database environment. The goal of the data redistribution operation is typically to balance the usage of storage space, improve database system performance, or satisfy other system requirements.

SUMMARY

Embodiments of the present invention disclose a method, a computer program product, and a system for online reorganization of database tables with concurrent updates using virtual partitions. In one embodiment, responsive to receiving a first table to reorganize, one or more first rows of the first table are selected, where the one or more first rows of the first table create a first virtual partition. A second memory for a second virtual partition is allocated, where the second virtual partition is appended to a second table. A first union view is created comprising a union of one or more first remaining rows of the first table with the second table, where the one or more first remaining rows of the first table have not been copied to the second table. The first virtual partition is copied into the second virtual partition. Responsive to receiving one or more first queries before copying the first virtual partition into the second virtual partition is complete, the one or more first queries are allowed to access the first union view. The advantage of this approach is that a database can be reorganized without quiescing the entire database, and this method requires less memory than existing techniques.

In some optional embodiments of the present invention, responsive to completion of copying the first virtual partition into the second virtual partition and completion of the one or more first queries, the first memory for the first virtual partition and the first union view is deallocated. Responsive to determining that any rows of the one or more rows of the first table have not been copied: a) one or more third rows of the first table are selected to create a third virtual partition, where the one or more third rows of the first table have not been copied to the second table; b) a fourth memory is allocated for a fourth virtual partition, where the fourth virtual partition is appended to the second table; c) a second union view is created comprising one or more second remaining rows of the first table and the second table, where the one or more second remaining rows of the first table have not been copied to the second table; d) the third virtual partition is copied into the fourth virtual partition; e) responsive to receiving one or more second queries before completion of copying the third virtual partition into the fourth virtual partition, the one or more second queries are allowed to access the second union view; and f) responsive to completion of copying the third virtual partition into the fourth virtual partition and completion of the one or more second queries, a third memory for the third virtual partition and the second union view is deallocated. The above steps of a-f are iteratively repeated until each row of the first table has been copied to the second table.

In some optional embodiments of the present invention, the total allocated memory does not exceed a predetermined threshold, where the total allocated memory includes the first memory, the second memory, the third memory, and the fourth memory.

In some optional embodiments of the present invention, responsive to determining that any rows of the first table have not been copied: a) one or more third rows of the first table are selected to create a third virtual partition, where the one or more third rows of the first table have not been copied to the second table; b) a fourth memory is allocated for a fourth virtual partition, where the fourth virtual partition is appended to the second table; c) a second union view is created comprising one or more second remaining rows of the first table and the second table, where the one or more second remaining rows of the first table have not been copied to the second table; d) the third virtual partition is copied into the fourth virtual partition; e) responsive to receiving one or more second queries before completion of copying the third virtual partition into the fourth virtual partition, the one or more second queries are allowed to access the second union view; and f) responsive to completion of the one or more first queries, the first union view is deallocated. The above steps of a-f are iteratively repeated until each row of the first table has been copied to the second table. Responsive to completion of the one or more second queries, the second union view is deallocated.

In some optional embodiments of the present invention, multiple union views are used in parallel.

In some optional embodiments of the present invention, the union of the one or more first remaining rows of the first table with the second table combines a result set of two or more selection statements with only distinct rows.

In some optional embodiments of the present invention, the second table utilizes different distribution/organizing keys than the first table.

DETAILED DESCRIPTION

The data reorganization/redistribution operation affects an entire table and requires the table to be recreated. Problems arise during this process if there are concurrent workloads running, such as queries or changes, which can include inserts, deletions, and update splits.

Database management systems do not support internal reorganization with proper synchronization with concurrent workloads. To ensure that data integrity is maintained, they usually require to quiesce the table, i.e., lock out all concurrent accesses, before starting the organizing/redistribution operation. Alternatively, the reorganization process creates reorganized shadow objects and atomically switches them with the original objects after completion. Concurrent changes are separately collected and are applied to the shadow objects during the switching phase, which—again—requires lock protection. This "downtime" should be preferably minimized, as many large companies cannot effectively function when part of their database is not accessible.

Presently, database management systems that support internal reorganization with proper synchronization of concurrent workloads exist, but the current art require additional memory which comprises the total size of the table under reorganization. During this process, incoming queries access a view, created from a union projection of both tables. In other words, the current art requires allocating memory at least twice the size of the table to be reorganized, and this memory has to be allocated for the duration of the reorganization process. This can be a serious problem, especially with very large table sizes in the ranges of several terabytes.

The present invention implements a solution to allow for concurrent queries and updates during data organizing/redistribution operations while keeping the additional system memory requirements below a predetermined threshold or dynamically evaluated limit. In other words, the maximum amount of additional system memory needed during the reorganization of database tables can be limited to a fixed size which the invention will not exceed, which allows for sufficient safety buffers with regard to the total available system memory, or could be calculated dynamically and anew for each step of the reorganization process, to use as much as reasonable of the available memory, but still not risking system stability because of a memory shortage.

As with the existing art, it is not necessary to quiesce the whole table, but only individual rows. The invention creates a second table, with same schema, but with the new distribution/organizing keys applied. (Other reorganization operations are not excluded and can be handled as well.) The data is then copied, row by row, from the old table to the new table. Unlike the existing art, it is not necessary to request system memory of the full size of the old table for the new table. Instead, only a fraction of the whole table size is allocated, which forms a first "virtual" partition. This first virtual partition of the new table corresponds to the same virtual partition of the old table, and in the first step of the reorganization data is copied over from the first virtual partition of the old table to the first virtual partition of the new table. When this completes, the memory of the first virtual partition of the old table is freed and can be used for other purposes. In the following iterative steps, the new table size is enlarged for a new virtual partition, the next step of row-by-row copy is started, and this continues until the last virtual partitions reach the end of the tables and the old table can be deleted. Although the size of the new table increases as new virtual partitions are created, the size of the old table is reduced as the memory allocated to the copied partitions is freed.

As in the existing art, during the reorganization process, incoming queries access a view, resulted from a union projection of both tables. The union command combines the result set of two or more select statements with only distinct rows, i.e., potential duplicate rows caused by the intermediate copy are deleted. In this way, rows that were already copied to the second table will only appear once in the view. In the existing art, however, the union view spans the entire old table as well as the entire new table. So in addition to allocating memory for two complete copies of the table, the existing art must also allocate memory up front for a union view that encompasses the entirety of both tables.

An important difference from the existing art is that the present invention incorporates the usage of virtual partitions for the stepwise transformation and copy process from the old table to the new table. The present invention performs the copy task, but not for the whole table in one single union view. A virtual partition in this context is any grouping of data rows, which can be identified and included into a row-wise copy operation, and a union view to control query operations. Space allocation of the new table is not done at once for the full equivalent of the original table size, but only for the next virtual partition to be copied over. In addition, after the current virtual copy process has completed and the last query which accesses this union view has finished, the data block of the virtual partition of the old table which was just copied over is truncated from the old table. As a result, the maximum additional (temporary) table space requirement is limited to the size of the currently copied virtual partitions.

Figure 1:
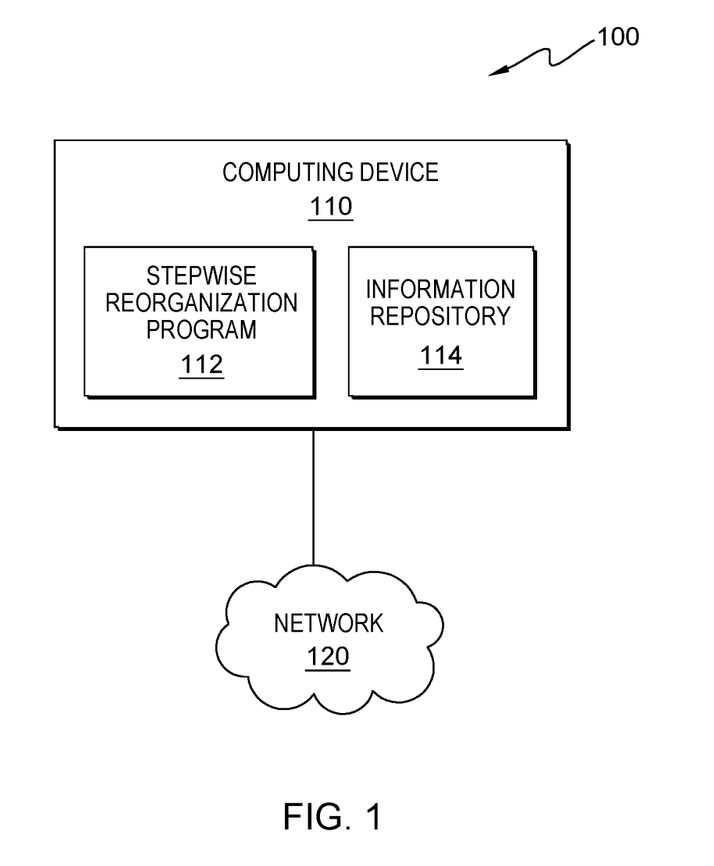
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of stepwise reorganization program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes stepwise reorganization program 112. In an embodiment, stepwise reorganization program 112 is a program, application, or subprogram of a larger program for online reorganization of database tables with concurrent updates using virtual partitions. In an alternative embodiment, stepwise reorganization program 112 may be located on any other device accessible by computing device 110 via network 120.

In an embodiment, computing device 110 includes information repository 114. In an embodiment, information repository 114 may be managed by stepwise reorganization program 112. In an alternate embodiment, information repository 114 may be managed by the operating system of the device, alone, or together with, stepwise reorganization program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, database data, query data, partition data, reorganization configuration data, replication data, system data, user data, and other data that is received by stepwise reorganization program 112 from one or more sources, and data that is created by stepwise reorganization program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 2:
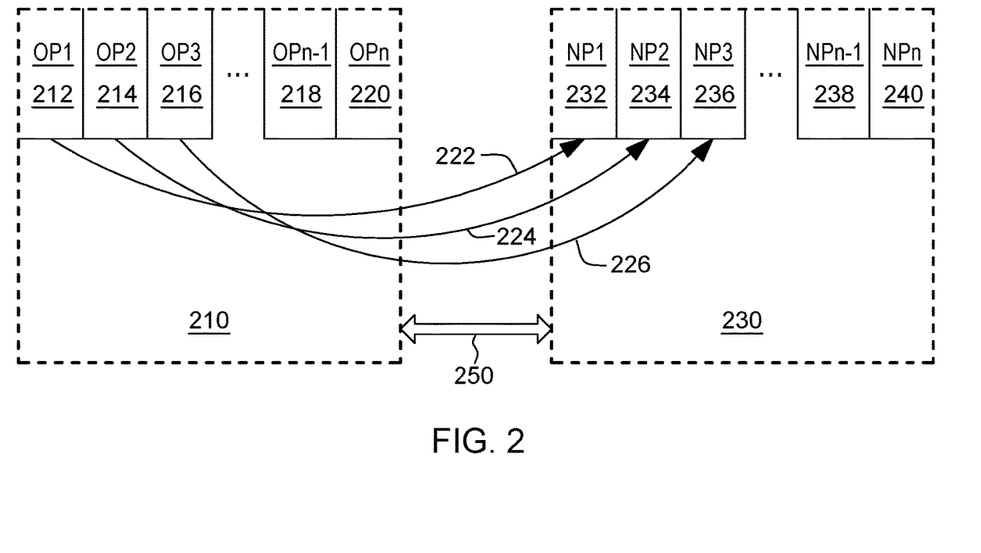
FIG. 2 is an example of a reorganization process using the existing art.

FIG. 2 is an example of a reorganization process using the existing art, as described above. In this example, each old partition in old table 210, including OP1 212, OP2 214, OP3 216, OPn-1 218, and OPn 220, is copied to the corresponding new partition in new table 230, including NP1 232, NP2 234, NP3 236, NPn-1 238, and NPn 240. New table 230 must be allocated enough memory from the outset to hold an entire copy of old table 210.

In this example, the data is copied from old partition OP1 212 to new partition NP1 232 in copy step_1 222; from old partition OP2 214 to new partition NP2 234 in copy step_2 224; and from old partition OP3 216 to new partition NP3 236 in copy step_3 226. During the reorganization process, union view 250 is created from the union projection of both the old and new tables that allows incoming queries to access a union of both tables during the reorganization process. This union view requires sufficient memory to hold both the entire old table and the entire new table throughout the reorganization process.

Figure 3A:
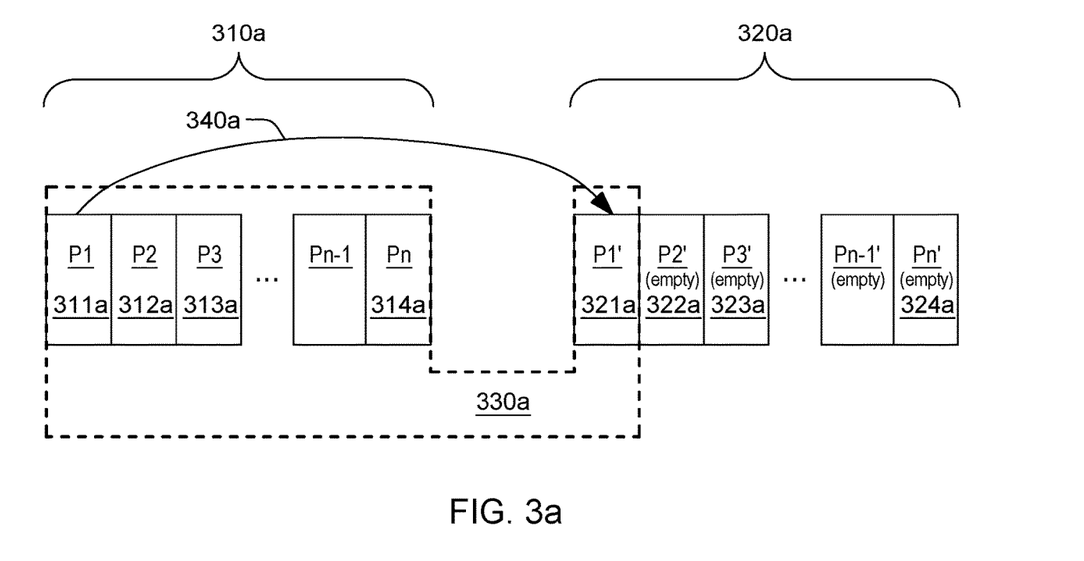
FIG. 3a is an example of moving a first partition during online reorganization of database tables with concurrent updates using virtual partitions, in accordance with an embodiment of the present invention.
Figure 3B:
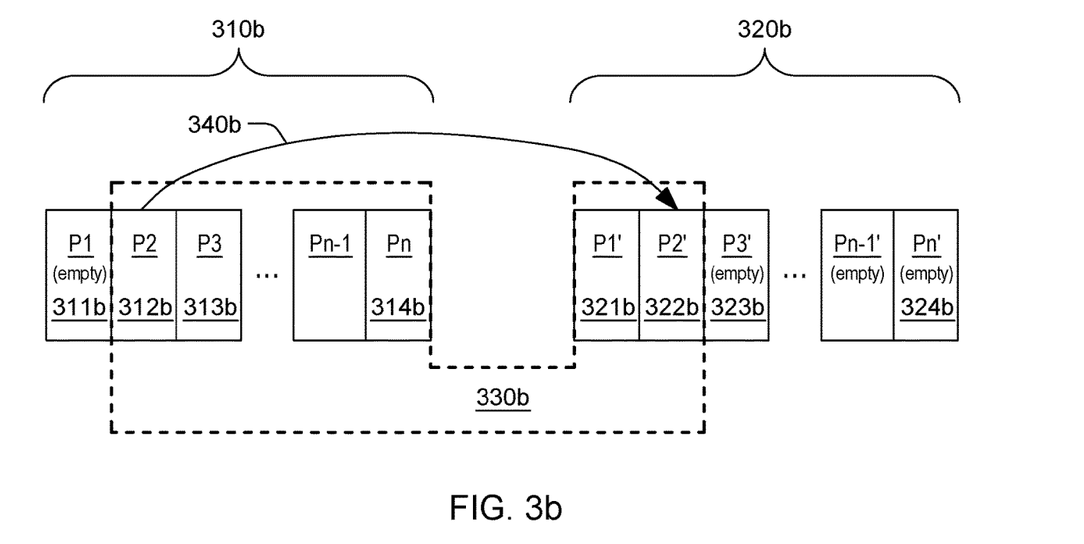
FIG. 3b is an example of moving a subsequent partition during online reorganization of database tables with concurrent updates using virtual partitions, in accordance with an embodiment of the present invention.

FIGS. 3a and 3b are an example of a reorganization process that is being performed by stepwise reorganization program 112. In this example, each old partition is copied to the corresponding new partition by stepwise reorganization program 112. During the reorganization process, a union view is created by stepwise reorganization program 112 incorporating the remaining partitions in the old table (since partitions are deleted once copied to the new table) and any virtual partitions in the new table that have already been filled. This allows queries to seamlessly access the tables during the reorganization process. In this process, memory is only allocated for any remaining partitions in the old table and any virtual partitions in the new table that have already been filled. This way, as memory is allocated for the next virtual partition to be created in the new table, memory is freed by deleting the finished partition from the old table.

In the example of FIG. 3a, the first partition of the old table is copied to the first virtual partition in the new table. Here, old table 310a is the old database table that is to be reorganized, and new table 320a is the new database table that is created during the reorganization process. At the completion of the reorganization process, new table 320a will be the resulting table, and old table 310a will have been removed from the system. As the copying of each partition completes, the partition is deleted to free memory. Old partitions P1 311a, P2 312a, P3 313a, and Pn 314a are the partitions for the old table that is to be reorganized. New partitions P1' 321a, P2' 322a, P3' 323a, and Pn' 324a are the partitions for the new table that are created during the reorganization process. These correspond 1:1 with the partitions in the old table. Union view 330a is a view created during the reorganization process resulting from the union projection of both the old table and the virtual partition in the new table that allows incoming queries to access a union of both tables during the reorganization process. This union view will remain active until the last query started in this view is complete. The union view for this partition will then be deleted, and the memory for the old partition will be freed. In copy step 340*a*, the data from old partition P1 311*a* is copied to new partition P1' 321*a*.

The example of FIG. 3*b* shows the next step after the initial creation of the first union view on the first virtual partition as shown in FIG. 3*a*. At this point a second union view with the next virtual partition is used to perform the row-wise data transformation and copy operation. This process is repeated until all partitions of the old table have been copied into the new table. In principle, for each new step which creates a new virtual partition on the new table a new union view needs to be created. This is because if a query accesses a view, that view is resolved and compiled into the query when the query starts. Subsequently, the query only accesses the underlying objects and uses the predicates as they were in the view when the query started. Thus, subsequent changes to the view definition do not have any effect on an already running query. Consequently, the union view needs to be maintained—as well as the included virtual partitions of the old table—as long as any queries are still running on it. As soon as the last query working on this particular union view completes, the union view can be deleted and also the virtual partition on the old table can be freed.

Here, old table 310*b* is the old database table that is to be reorganized, and new table 320*b* is the new database table that is created during the reorganization process. At the completion of the reorganization process, new table 320*b* will be the resulting table, and old table 310*b* will have been removed from the system. As the copying of each partition completes, the partition is deleted to free memory. Old partitions P1 311*b*, P2 312*b*, P3 313*b*, and Pn 314*b* are the partitions for the old table that is to be reorganized. New partitions P1' 321*b*, P2' 322*b*, P3' 323*b*, and Pn' 324*b* are the partitions for the new table that are created during the reorganization process. These correspond 1:1 with the partitions in the old table. Union view 330*b* is a view created during the reorganization process resulting from the union projection of both the remaining partitions in the old table and the virtual partition in the new table, along with any partitions in the new table that have already been copied, that allows incoming queries to access a union of both tables during the reorganization process. This union view will remain active until the last query started in this view is complete. The union view for this partition will then be deleted, and the memory for the old partition will be freed. In copy step 340*b*, the data from old partition P2 312*b* is copied to new partition P2' 322*b*. In the example of FIG. 3*b*, old partition P1 311*b* has already been copied, so it is not included in union view 330*b*. New partition P1' 321*b* is, however, included in union view 330*b* since the data from old partition P1 311*b* has already been copied to it.

In a preferred embodiment, the system evaluates free system memory before each of the steps of the iterative reorganization starts and optimizes the block size of the virtual partition to be created in such a way that there is always enough free system memory left to avoid memory shortage of the system. In another embodiment, a predetermined threshold limits the amount of memory may be allocated for the reorganization operation. In both situations it can be assured that the reorganization of very large tables will not risk system stability because of memory shortage, and in addition allows for reorganization of extremely large tables which would not have been possible otherwise due to insufficient system memory.

In another embodiment the system may react dynamically to a temporary system memory shortage and adjust the block sizes of the next virtual partitions accordingly, until the shortage has been resolved.

In yet another embodiment, after all data of a particular union view has been copied from a partition on the old table to the virtual partition on the new table, but queries are still running on this particular union view, instead of waiting for these queries to end, a new union view for the next iteration may be created, the next data copy step started, and new queries bound to the new view while the queries are still running on the previous view. In other words, while waiting for the queries of the previous union view to end to finally free the table memory of the previous virtual partition, the next step can already be started to shorten the total time for table reorganization. The amount of parallel union views must be limited so as not to exceed the maximum allowed additional system memory which can be used at a given point in time during the whole table reorganization process. In various embodiments of the invention, the maximum allowed additional system memory which can be used at a given point in time is a predetermined threshold or dynamically evaluated limit. A flow diagram of this embodiment is given in FIG. 5 below.

Figure 4:
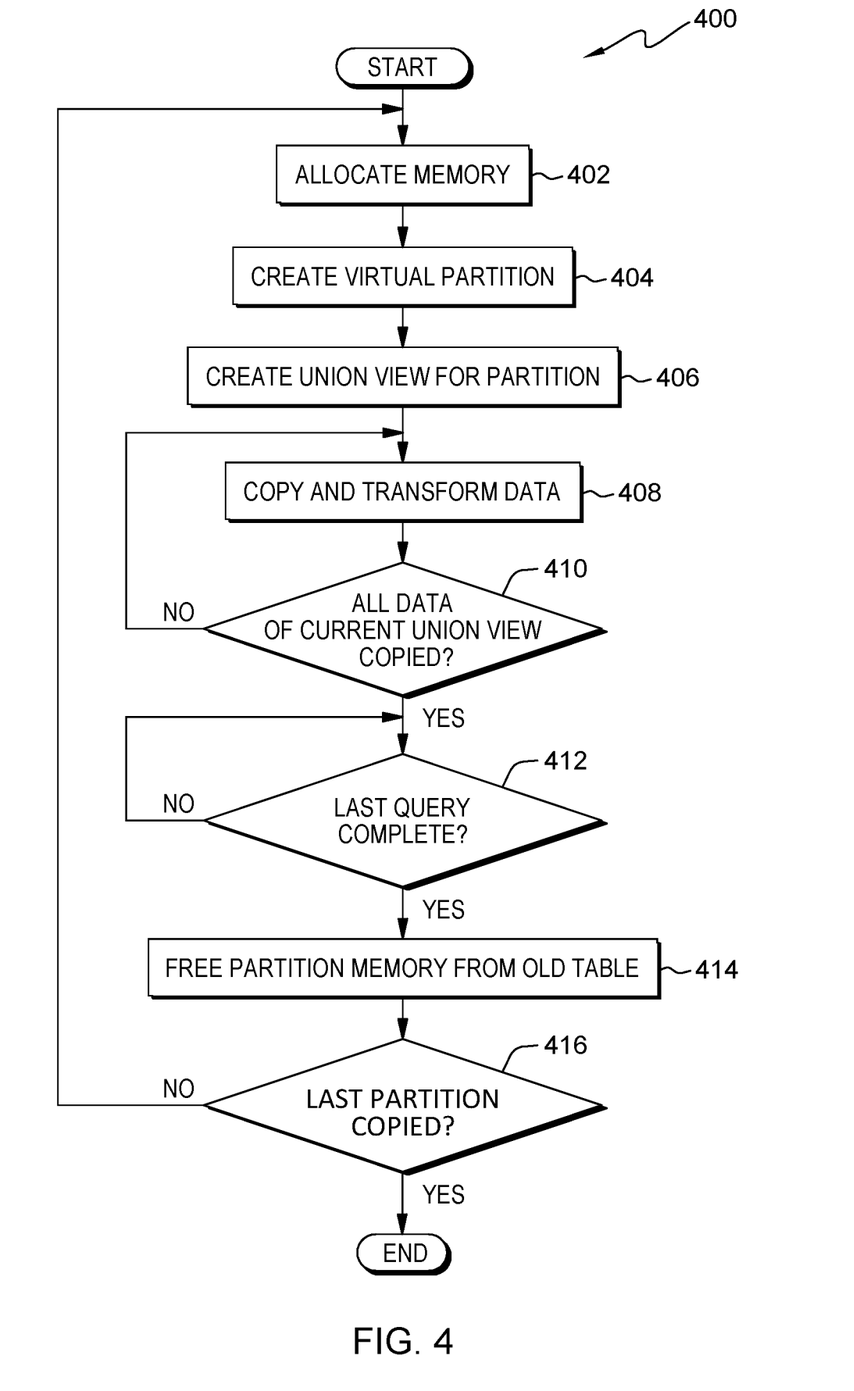
FIG. 4 is a flowchart depicting operational steps of the stepwise reorganization program, on a computing device within the distributed data processing environment of FIG. 1, for online reorganization of database tables with concurrent updates, in accordance with an embodiment of the present invention.

FIG. 4 is a flowchart depicting operational steps of the stepwise reorganization program, on a computing device within the distributed data processing environment of FIG. 1, for online reorganization of database tables with concurrent updates, in accordance with an embodiment of the present invention. In an alternative embodiment, the steps of workflow 400 may be performed by any other program while working with stepwise reorganization program 112. In an embodiment, stepwise reorganization program 112 allocates memory for the virtual partition in the new table to move the data from the currently selected partition in the old table according to a memory strategy. In an embodiment, stepwise reorganization program 112 creates a virtual partition for the new table into which the data from the corresponding partition in the old table will be copied and transformed into the distribution keys of the reorganized table. In an embodiment, stepwise reorganization program 112 creates a view from the union of the remaining partitions in the old table (i.e., those that have not yet been copied and transformed into the new table) and the new table for new queries. In an embodiment, stepwise reorganization program 112 copies the data from the current partition in the old table to the virtual partition in the new table. In an embodiment, stepwise reorganization program 112 determines if all data of the current union view has been copied to the virtual partition in the new table. In an embodiment, stepwise reorganization program 112 determines if the last query for the current union view has completed. In an embodiment, if stepwise reorganization program 112 determines that the last query for the current union view has completed, then the current union view is no longer needed. Stepwise reorganization program 112 then discards the current union view and frees up resources, including deleting the partition in the old table that has now been moved to the new table. In an embodiment, stepwise reorganization program 112 determines if the last partition in the old table has been copied to the new table. In an embodiment, if stepwise reorganization program 112 determines that the last partition has been copied to the new table, then stepwise reorganization program 112 discards the old table and ends for this cycle.

It should be appreciated that embodiments of the present invention provide at least for online reorganization of database tables with concurrent updates using virtual partitions.

However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Stepwise reorganization program 112 allocates memory (step 402). In an embodiment, stepwise reorganization program 112 allocates memory for the virtual partition in the new table to move the data from the currently selected partition in the old table according to a memory strategy. The various strategies follow an optimization goal of imposing least impact on system stability by best query performance and shortest overall process duration.

In an embodiment, the memory allocation strategy is to stay within a predefined amount of additional memory, which is allowed to be allocated at any given point in time during the reorganization process. In this scenario the newly allocated partitions have to stay within this limit.

In another embodiment, the memory allocation strategy is to check the currently available system memory before allocating the memory for the next step and, in a worst case, pause the reorganization process until enough system memory is freed to allow the reorganization process to proceed.

In an embodiment, stepwise reorganization program 112 also allocates memory for the union view for the currently selected partition.

Stepwise reorganization program 112 creates a virtual partition (step 404). In an embodiment, stepwise reorganization program 112 creates a virtual partition for the new table into which the data from the corresponding partition in the old table will be copied and transformed into the distribution keys of the reorganized table. In an embodiment, stepwise reorganization program 112 creates the virtual partition for the new table using memory allocated in step 402. In an embodiment, stepwise reorganization program 112 appends the virtual partition to the new table.

Stepwise reorganization program 112 creates a union view for the partition (step 406). In an embodiment, stepwise reorganization program 112 creates a view for new queries from the union of the remaining partitions in the old table (i.e., those that have not yet been copied and transformed into the new table) and the new table. This union view has visibility into both the remaining old table partitions and the partitions in the new table that have already been filled, including the virtual partition into which the data currently being written. In an embodiment, stepwise reorganization program 112 creates the union view using memory allocated in step 402.

In an embodiment, reorganization program 112 creates the union view for the partition from a union projection of both tables. In an embodiment, the union command combines the result set of two or more select statements with only distinct rows, i.e., potential duplicate rows caused by the intermediate copy are suppressed. In this way, rows that were already copied to the second table will only appear once in the view.

Stepwise reorganization program 112 copies and transform data (step 408). In an embodiment, stepwise reorganization program 112 copies the data from the current partition in the old table to the virtual partition in the new table. In an embodiment, stepwise reorganization program 112 transforms the data during the copy step from the distribution/organizing keys from the old table to the distribution/organizing keys for the new table.

Stepwise reorganization program 112 determines if all data of current union view has been copied (decision block 410). In an embodiment, stepwise reorganization program 112 determines if all data of the current union view has been copied to the virtual partition in the new table. In an embodiment, stepwise reorganization program 112 determines that all data of the current union view has been copied to the virtual partition in the new table if each row of data in the partition of the old table has been copied and transformed to the new table in step 408. In an embodiment, if stepwise reorganization program 112 determines that all data of the current union view has not been copied to the virtual partition in the new table ("no" branch, decision block 410), then stepwise reorganization program 112 returns to step 408 to continue copying and transforming the data. In an embodiment, if stepwise reorganization program 112 determines that all data of the current union view has been copied to the virtual partition in the new table ("yes" branch, decision block 410), then stepwise reorganization program 112 proceeds to decision block 412.

Stepwise reorganization program 112 determines if the last query is complete (decision block 412). In an embodiment, stepwise reorganization program 112 determines if the last query for the current union view has completed. In an embodiment, if stepwise reorganization program 112 determines that the last query for the current union view has not completed ("no" branch, decision block 412), then stepwise reorganization program 112 remains in decision block 412 until the last query completes. In an embodiment, if stepwise reorganization program 112 determines that the last query for the current union view has completed ("yes" branch, decision block 412), then stepwise reorganization program 112 proceeds to step 414.

Stepwise reorganization program 112 frees the partition memory from the old table (step 414). In an embodiment, if stepwise reorganization program 112 determines that the last query for the current union view has completed, then the current union view is no longer needed. Stepwise reorganization program 112 then deallocates the memory for the current union view and frees up resources, including deallocating the memory for the partition in the old table that has now been moved to the new table.

Stepwise reorganization program 112 determines if the last partition is copied (decision block 416). In an embodiment, stepwise reorganization program 112 determines if the last partition in the old table has been copied to the new table. In an embodiment, if stepwise reorganization program 112 determines that the last partition has not yet been copied to the new table, ("no" branch, decision block 416), then stepwise reorganization program 112 returns to step 402 to move to the next partition. In an embodiment, if stepwise reorganization program 112 determines that the last partition has been copied to the new table, ("yes" branch, decision block 416), then stepwise reorganization program 112 discards the old table and ends for this cycle.

Figure 5:
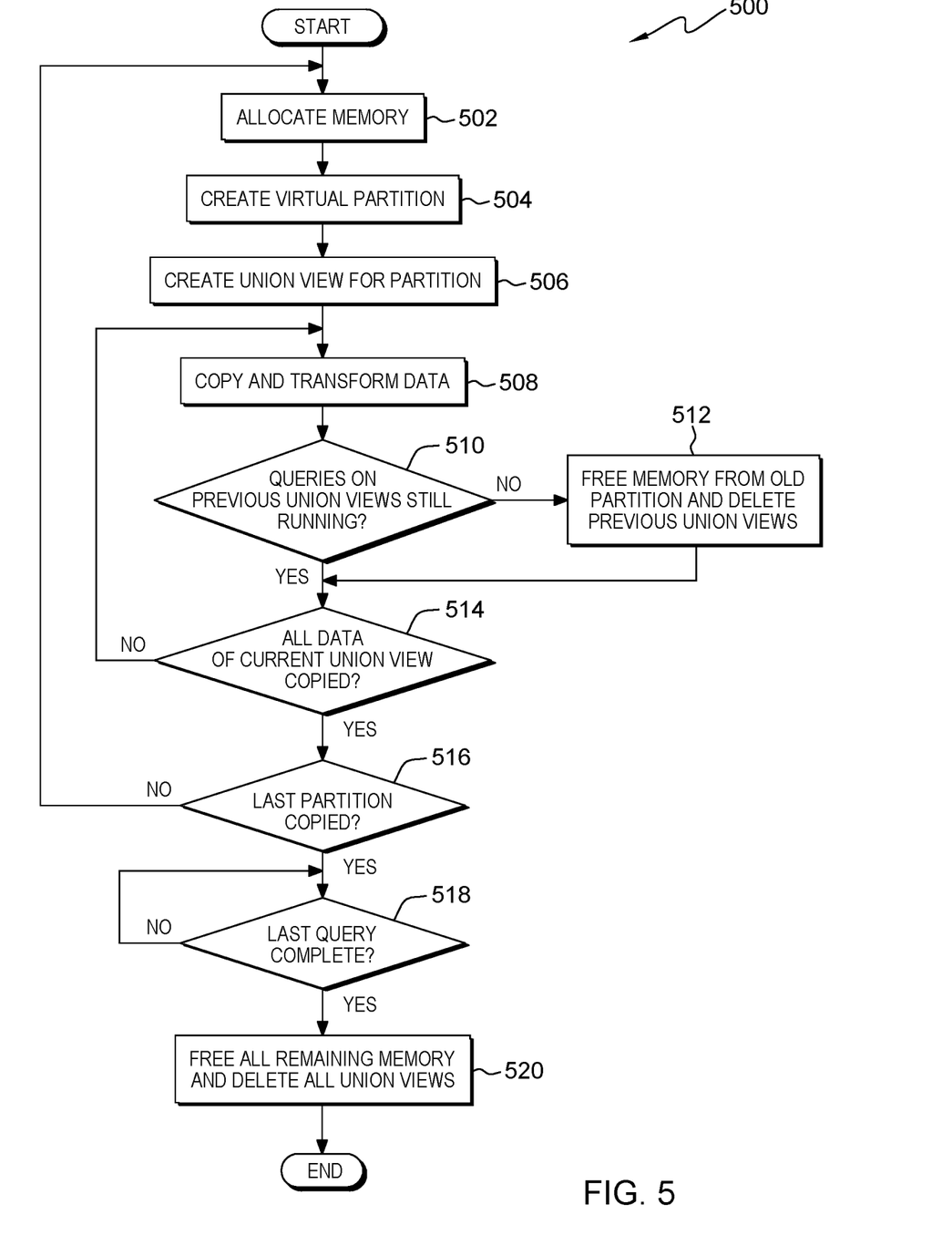
FIG. 5 is a flowchart depicting operational steps for an alternate embodiment of the stepwise reorganization program, on a computing device within the distributed data processing environment of FIG. 1, for online reorganization of database tables with concurrent updates.

FIG. 5 is a flowchart depicting operational steps for an alternate embodiment of the stepwise reorganization program, on a computing device within the distributed data processing environment of FIG. 1, for online reorganization of database tables with concurrent updates. The alternate embodiment of FIG. 5 shows an alternate workflow, where, for the cost of higher temporary memory required, the iterative steps are performed in an "interlaced" mode. When the copy operation completes on a particular virtual partition, queries may still be running against the corresponding union view. In the flow of FIG. 4 above, the iterative process pauses until the last query completes. In this alternative workflow, if the memory strategy allows for allocation of sufficient additional memory, the next copy operation on the next partition may begin, and the previous queries exist in parallel until the last query on the previous union view(s) ended. This alternative workflow could shorten the total time needed for the whole table reorganization process.

In an alternative embodiment, the steps of workflow 500 may be performed by any other program while working with stepwise reorganization program 112. In an embodiment, stepwise reorganization program 112 allocates memory for the virtual partition in the new table to move the data from the currently selected partition in the old table according to a memory strategy. In an embodiment, stepwise reorganization program 112 creates a virtual partition for the new table into which the data from the corresponding partition in the old table will be copied and transformed into the distribution keys of the reorganized table. In an embodiment, stepwise reorganization program 112 creates a view from the union of the remaining partitions in the old table (i.e., those that have not yet been copied and transformed into the new table) and the new table for new queries. In an embodiment, stepwise reorganization program 112 copies the data from the current partition in the old table to the virtual partition in the new table. In an embodiment, stepwise reorganization program 112 determines if any queries are still running on any of the union views for any of the partitions that have already been copied and transformed to the new table. In an embodiment, if stepwise reorganization program 112 determines that no queries are still running on any of the union views for any of the partitions that have already been copied and transformed to the new table, then stepwise reorganization program 112 frees the memory from the partition on the old table and deletes the union view, freeing the memory allocated to the union view, for each union view for which all queries have completed. In an embodiment, stepwise reorganization program 112 determines if all data of the current union view has been copied to the virtual partition in the new table. In an embodiment, stepwise reorganization program 112 determines if the last partition in the old table has been copied to the new table. In an embodiment, stepwise reorganization program 112 determines if the last query for the current union view has completed. In an embodiment, if stepwise reorganization program 112 determines that no queries are still running on any of the union views, then stepwise reorganization program 112 frees all remaining memory from the partitions on the old table and deletes all the remaining union views. Stepwise reorganization program 112 then ends for this cycle.

It should be appreciated that embodiments of the present invention provide at least for online reorganization of database tables with concurrent updates using virtual partitions. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Stepwise reorganization program 112 allocates memory (step 502). In an embodiment, stepwise reorganization program 112 allocates memory for the virtual partition in the new table to move the data from the currently selected partition in the old table according to a memory strategy. The various strategies follow an optimization goal of imposing least impact on system stability by best query performance and shortest overall process duration.

In an embodiment, the memory allocation strategy is to stay within a predefined amount of additional memory, which is allowed to be allocated at any given point in time during the reorganization process. In this scenario the newly allocated partitions have to stay within this limit. In this embodiment, when starting to copy over the next partition data (for which new memory is needed) while queries are still running against the previous view(s), stepwise reorganization program 112 cannot free the corresponding memory pieces of the old table until all queries against the previous view(s) have completed.

In another embodiment, the memory allocation strategy is to check the currently available system memory before allocating the memory for the next step and, in a worst case, pause the reorganization process until enough system memory is freed to allow the reorganization process to proceed.

In an embodiment, stepwise reorganization program 112 also allocates memory for the union view for the currently selected partition.

Stepwise reorganization program 112 creates a virtual partition (step 504). In an embodiment, stepwise reorganization program 112 creates a virtual partition for the new table into which the data from the corresponding partition in the old table will be copied and transformed into the distribution keys of the reorganized table. In an embodiment, stepwise reorganization program 112 creates the virtual partition for the new table using memory allocated in step 502. In an embodiment, stepwise reorganization program 112 appends the virtual partition to the new table.

Stepwise reorganization program 112 creates a union view for the partition (step 506). In an embodiment, stepwise reorganization program 112 creates a view from the union of the remaining partitions in the old table (i.e., those that have not yet been copied and transformed into the new table) and the new table for new queries. This union view has visibility into both the remaining old table partitions and the partitions in the new table that have already been filled, including the virtual partition into which the data currently being written. In an embodiment, stepwise reorganization program 112 creates the union view using memory allocated in step 502.

In an embodiment, reorganization program 112 creates the union view for the partition from a union projection of both tables. In an embodiment, the union command combines the result set of two or more select statements with only distinct rows, i.e., potential duplicate rows caused by the intermediate copy are suppressed. In this way, rows that were already copied to the second table will only appear once in the view.

Stepwise reorganization program 112 copies and transform data (step 508). In an embodiment, stepwise reorganization program 112 copies the data from the current partition in the old table to the virtual partition in the new table. In an embodiment, stepwise reorganization program 112 transforms the data during the copy step from the distribution/organizing keys from the old table to the distribution/organizing keys for the new table.

Stepwise reorganization program 112 determines if any queries on the previous union views are still running (decision block 510). In an embodiment, stepwise reorganization program 112 determines if any queries are still running on any of the union views for any of the partitions that have already been copied and transformed to the new table. Since any queries running on these union views require the union view to complete the copy and transform process, these union views cannot be deleted until all queries using them have completed. In an embodiment, if stepwise reorganization program 112 determines that no queries are still running on any one of the union views for any of the partitions that have already been copied and transformed to the new table ("no" branch, decision block 510), then stepwise reorganization program 112 proceeds to step 512 to free the memory for any union view on which all queries have completed. Note that the branch is determined individually for each union view for which the copy operation has completed but may have queries still running, i.e., some union views may have completed while other union views may not have completed.

In an embodiment, if stepwise reorganization program 112 determines that any queries are still running on any of the union views for any of the partitions that have already been copied and transformed to the new table ("yes" branch, decision block 510), then stepwise reorganization program 112 proceeds to decision block 514 to determine if all data has been copied from the current union view partition.

In another embodiment, stepwise reorganization program 112 determines if any queries were started before stepwise reorganization program 112 started executing. If any queries are still running that were started before stepwise reorganization program 112 started executing, then no partitions can be deleted until those queries have completed. In this embodiment, if any queries are still running that were started before stepwise reorganization program 112 started executing, then stepwise reorganization program 112 proceeds to decision block 514 to determine if all data has been copied from the current union view partition.

Stepwise reorganization program 112 frees the memory from the old partition and deletes the previous union views (step 512). In an embodiment, if stepwise reorganization program 112 determines that all queries have completed on any of the union views for any of the partitions that have already been copied and transformed to the new table, then stepwise reorganization program 112 deallocates the memory from the partition on the old table and the memory allocated to the union view, for each union view for which all queries have completed. It should be noted that this is performed individually for each union view created by stepwise reorganization program 112, i.e., all queries on one previous union view may have completed, so the memory can be freed from that union view and its corresponding partition on the old table, while queries may still be running on other previous union views, so the memory cannot be freed from those union views and their corresponding partitions on the old table.

Stepwise reorganization program 112 determines if all data of current union view has been copied (decision block 514). In an embodiment, stepwise reorganization program 112 determines if all data of the current union view has been copied to the virtual partition in the new table. In an embodiment, stepwise reorganization program 112 determines that all data of the current union view has been copied to the virtual partition in the new table if each row of data in the partition of the old table has been copied and transformed to the new table in step 508. In an embodiment, if stepwise reorganization program 112 determines that all data of the current union view has not been copied to the virtual partition in the new table ("no" branch, decision block 514), then stepwise reorganization program 112 returns to step 508 to continue copying and transforming the data. In an embodiment, if stepwise reorganization program 112 determines that all data of the current union view has been copied to the virtual partition in the new table ("yes" branch, decision block 514), then stepwise reorganization program 112 proceeds to decision block 516.

Stepwise reorganization program 112 determines if the last partition is copied (decision block 516). In an embodiment, stepwise reorganization program 112 determines if the last partition in the old table has been copied to the new table. In an embodiment, if stepwise reorganization program 112 determines that the last partition has not yet been copied to the new table, ("no" branch, decision block 516), then stepwise reorganization program 112 returns to step 502 to move to the next partition. In an embodiment, if stepwise reorganization program 112 determines that the last partition has been copied to the new table, ("yes" branch, decision block 516), then stepwise reorganization program 112 proceeds to decision block 518.

Stepwise reorganization program 112 determines if the last query is complete (decision block 518). In an embodiment, stepwise reorganization program 112 determines if the last query for the current union view has completed. In an embodiment, if stepwise reorganization program 112 determines that the last query for the current union view has not completed ("no" branch, decision block 518), then stepwise reorganization program 112 remains in decision block 518 until the last query completes. In an embodiment, if stepwise reorganization program 112 determines that the last query for the current union view has completed ("yes" branch, decision block 412), then stepwise reorganization program 112 proceeds to step 520.

Stepwise reorganization program 112 frees the memory from the old partition and deletes the previous union views (step 520). In an embodiment, if stepwise reorganization program 112 determines that no queries are still running on any of the union views, then stepwise reorganization program 112 deallocates all remaining memory from the partitions on the old table and deletes all the remaining union views, thereby deallocating the memory used by the union view. Stepwise reorganization program 112 then ends for this cycle.

Figure 6:
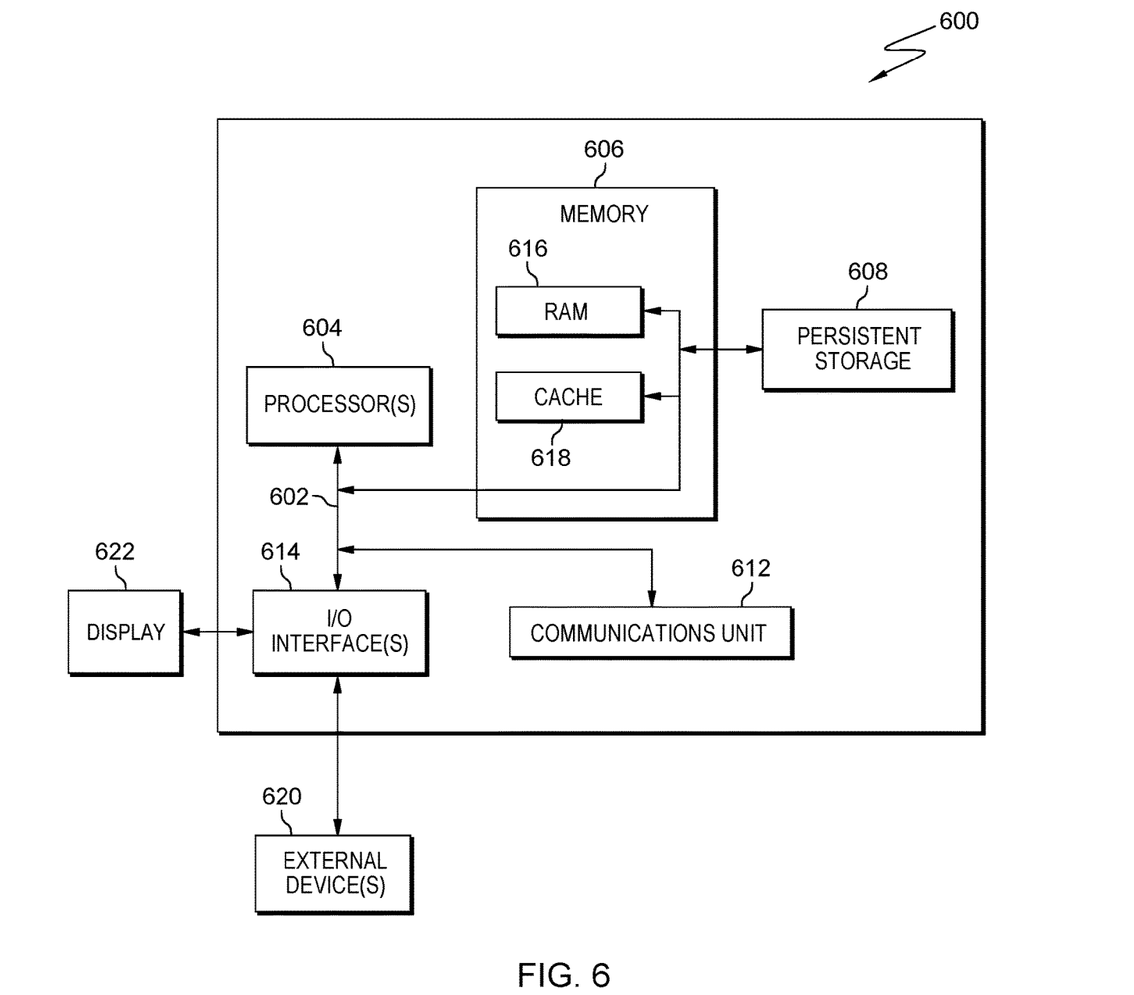
FIG. 6 depicts a block diagram of components of the computing devices executing the stepwise reorganization program within the distributed data processing environment of FIG. 1, in accordance with an embodiment of the present invention.

FIG. 6 is a block diagram depicting components of computing device 110 suitable for stepwise reorganization program 112, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for stepwise reorganization program 112 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., stepwise reorganization program 112, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for database table reorganization, the computer-implemented method comprising:
    responsive to receiving a first table to reorganize, selecting, by one or more computer processors, one or more first rows of the first table, wherein the one or more first rows of the first table create a first virtual partition;
    allocating, by the one or more computer processors, a second memory for a second virtual partition, wherein the second virtual partition is appended to a second table;
    creating, by the one or more computer processors, a first union view comprising a union of one or more first remaining rows of the first table with the second table, wherein the one or more first remaining rows of the first table have not been copied to the second table;
    copying, by the one or more computer processors, the first virtual partition into the second virtual partition; and
    responsive to receiving one or more first queries before copying the first virtual partition into the second virtual partition is complete, allowing, by the one or more computer processors, the one or more first queries to access the first union view.

2. The computer-implemented method of claim 1, further comprising:
    responsive to completion of copying the first virtual partition into the second virtual partition and completion of the one or more first queries, deallocating, by the one or more computer processors, a first memory for the first virtual partition and the first union view;
    responsive to determining that any rows of the one or more rows of the first table have not been copied:
        a) selecting, by the one or more computer processors, one or more third rows of the first table to create a third virtual partition, wherein the one or more third rows of the first table have not been copied to the second table;
        b) allocating, by the one or more computer processors, a fourth memory for a fourth virtual partition, wherein the fourth virtual partition is appended to the second table;
        c) creating, by the one or more computer processors, a second union view comprising one or more second remaining rows of the first table and the second table, wherein the one or more second remaining rows of the first table have not been copied to the second table;
        d) copying, by the one or more computer processors, the third virtual partition into the fourth virtual partition;
        e) responsive to receiving one or more second queries before completion of copying the third virtual partition into the fourth virtual partition, allowing, by the one or more computer processors, the one or more second queries to access the second union view;
        f) responsive to completion of copying the third virtual partition into the fourth virtual partition and completion of the one or more second queries, deallocating, by the one or more computer processors, a third memory for the third virtual partition and the second union view; and
    iteratively repeating, by the one or more computer processors, above steps of a-f until each row of the first table has been copied to the second table.

3. The computer-implemented method of claim 2, wherein a total allocated memory does not exceed a predetermined threshold, and further wherein the total allocated memory includes the first memory, the second memory, the third memory, and the fourth memory.

4. The computer-implemented method of claim 1, further comprising:
responsive to determining that any rows of the one or more rows of the first table have not been copied:
a) selecting, by the one or more computer processors, one or more third rows of the first table to create a third virtual partition, wherein the one or more third rows of the first table have not been copied to the second table;
b) allocating, by the one or more computer processors, a fourth memory for a fourth virtual partition, wherein the fourth virtual partition is appended to the second table;
c) creating, by the one or more computer processors, a second union view comprising one or more second remaining rows of the first table and the second table, wherein the one or more second remaining rows of the first table have not been copied to the second table;
d) copying, by the one or more computer processors, the third virtual partition into the fourth virtual partition;
e) responsive to receiving one or more second queries before completion of copying the third virtual partition into the fourth virtual partition, allowing, by the one or more computer processors, the one or more second queries to access the second union view;
f) responsive to completion of the one or more first queries, deallocating, by the one or more computer processors, the first union view;
iteratively repeating, by the one or more computer processors, above steps of a-f until each row of the first table has been copied to the second table; and
responsive to completion of the one or more second queries, deallocating, by the one or more computer processors, the second union view.

5. The computer-implemented method of claim 4, wherein multiple union views are used in parallel.

6. The computer-implemented method of claim 1, wherein the union of the one or more first remaining rows of the first table with the second table combines a result set of two or more selection statements with only distinct rows.

7. The computer-implemented method of claim 1, wherein the second table utilizes different distribution/organizing keys than the first table.

8. A computer program product for database table reorganization, the computer program product comprising:
one or more computer readable storage devices and program instructions stored on the one or more computer readable storage devices, the stored program instructions comprising:
responsive to receiving a first table to reorganize, select one or more first rows of the first table, wherein the one or more first rows of the first table create a first virtual partition;
allocate a second memory for a second virtual partition, wherein the second virtual partition is appended to a second table;
create a first union view comprising a union of one or more first remaining rows of the first table with the second table, wherein the one or more first remaining rows of the first table have not been copied to the second table;
copy the first virtual partition into the second virtual partition; and
responsive to receiving one or more first queries before copying the first virtual partition into the second virtual partition is complete, allow the one or more first queries to access the first union view.

9. The computer program product of claim 8, further comprises one or more of the following program instructions, stored on the one or more computer readable storage media, to:
responsive to completion of copying the first virtual partition into the second virtual partition and completion of the one or more first queries, deallocate a first memory for the first virtual partition and the first union view;
responsive to determining that any rows of the one or more rows of the first table have not been copied:
a) select one or more third rows of the first table to create a third virtual partition, wherein the one or more third rows of the first table have not been copied to the second table;
b) allocate a fourth memory for a fourth virtual partition, wherein the fourth virtual partition is appended to the second table;
c) create a second union view comprising one or more second remaining rows of the first table and the second table, wherein the one or more second remaining rows of the first table have not been copied to the second table;
d) copy the third virtual partition into the fourth virtual partition;
e) responsive to receiving one or more second queries before completion of copying the third virtual partition into the fourth virtual partition, allow the one or more second queries to access the second union view;
f) responsive to completion of copying the third virtual partition into the fourth virtual partition and completion of the one or more second queries, deallocate a third memory for the third virtual partition and the second union view; and
iteratively repeat above steps of a-f until each row of the first table has been copied to the second table.

10. The computer program product of claim 9, wherein a total allocated memory does not exceed a predetermined threshold, and further wherein the total allocated memory includes the first memory, the second memory, the third memory, and the fourth memory.

11. The computer program product of claim 8, further comprising one or more of the following program instructions, stored on the one or more computer readable storage media, to:
responsive to determining that any rows of the one or more rows of the first table have not been copied:
a) select one or more third rows of the first table to create a third virtual partition, wherein the one or more third rows of the first table have not been copied to the second table;
b) allocate a fourth memory for a fourth virtual partition, wherein the fourth virtual partition is appended to the second table;
c) create a second union view comprising one or more second remaining rows of the first table and the second table, wherein the one or more second remaining rows of the first table have not been copied to the second table;

d) copy the third virtual partition into the fourth virtual partition;

e) responsive to receiving one or more second queries before completion of copying the third virtual partition into the fourth virtual partition, allow the one or more second queries to access the second union view;

f) responsive to completion of the one or more first queries, deallocate the first union view;

iteratively repeat above steps of a-f until each row of the first table has been copied to the second table; and responsive to completion of the one or more second queries, deallocate the second union view.

12. The computer program product of claim 11, wherein multiple union views are used in parallel.

13. The computer program product of claim 8, wherein the union of the one or more first remaining rows of the first table with the second table combines a result set of two or more selection statements with only distinct rows.

14. The computer program product of claim 8, wherein the second table utilizes different distribution/organizing keys than the first table.

15. A computer system for database table reorganization, the computer system comprising:

one or more computer processors;

one or more computer readable storage media; and program instructions stored on the one or more computer readable storage media for execution by at least one of the one or more computer processors, the stored program instructions comprising:

responsive to receiving a first table to reorganize, select one or more first rows of the first table, wherein the one or more first rows of the first table create a first virtual partition;

allocate a second memory for a second virtual partition, wherein the second virtual partition is appended to a second table;

create a first union view comprising a union of one or more first remaining rows of the first table with the second table, wherein the one or more first remaining rows of the first table have not been copied to the second table;

copy the first virtual partition into the second virtual partition; and responsive to receiving one or more first queries before copying the first virtual partition into the second virtual partition is complete, allow the one or more first queries to access the first union view.

16. The computer system of claim 15, further comprises one or more of the following program instructions, stored on the one or more computer readable storage media, to:

responsive to completion of copying the first virtual partition into the second virtual partition and completion of the one or more first queries, deallocate a first memory for the first virtual partition and the first union view;

responsive to determining that any rows of the one or more rows of the first table have not been copied:

a) select one or more third rows of the first table to create a third virtual partition, wherein the one or more third rows of the first table have not been copied to the second table;

b) allocate a fourth memory for a fourth virtual partition, wherein the fourth virtual partition is appended to the second table;

c) create a second union view comprising one or more second remaining rows of the first table and the second table, wherein the one or more second remaining rows of the first table have not been copied to the second table;

d) copy the third virtual partition into the fourth virtual partition;

e) responsive to receiving one or more second queries before completion of copying the third virtual partition into the fourth virtual partition, allow the one or more second queries to access the second union view;

f) responsive to completion of copying the third virtual partition into the fourth virtual partition and completion of the one or more second queries, deallocate a third memory for the third virtual partition and the second union view; and iteratively repeat above steps of a-f until each row of the first table has been copied to the second table.

17. The computer system of claim 16, wherein a total allocated memory does not exceed a predetermined threshold, and further wherein the total allocated memory includes the first memory, the second memory, the third memory, and the fourth memory.

18. The computer system of claim 15, further comprising one or more of the following program instructions, stored on the one or more computer readable storage media, to:

responsive to determining that any rows of the one or more rows of the first table have not been copied:

a) select one or more third rows of the first table to create a third virtual partition, wherein the one or more third rows of the first table have not been copied to the second table;

b) allocate a fourth memory for a fourth virtual partition, wherein the fourth virtual partition is appended to the second table;

c) create a second union view comprising one or more second remaining rows of the first table and the second table, wherein the one or more second remaining rows of the first table have not been copied to the second table;

d) copy the third virtual partition into the fourth virtual partition;

e) responsive to receiving one or more second queries before completion of copying the third virtual partition into the fourth virtual partition, allow the one or more second queries to access the second union view;

f) responsive to completion of the one or more first queries, deallocate the first union view;

iteratively repeat above steps of a-f until each row of the first table has been copied to the second table; and responsive to completion of the one or more second queries, deallocate the second union view.

19. The computer system of claim 18, wherein multiple union views are used in parallel.

20. The computer system of claim 15, wherein the union of the one or more first remaining rows of the first table with the second table combines a result set of two or more selection statements with only distinct rows.

* * * * *